Dec. 11, 1956 — E. O. TOLONEN — 2,773,535
REINFORCEMENT FOR MOLDED FLAPS
Filed Aug. 24, 1953 — 2 Sheets-Sheet 1

INVENTOR.
ERIC O. TOLONEN
BY
Irwin M. Lewis
ATTORNEY

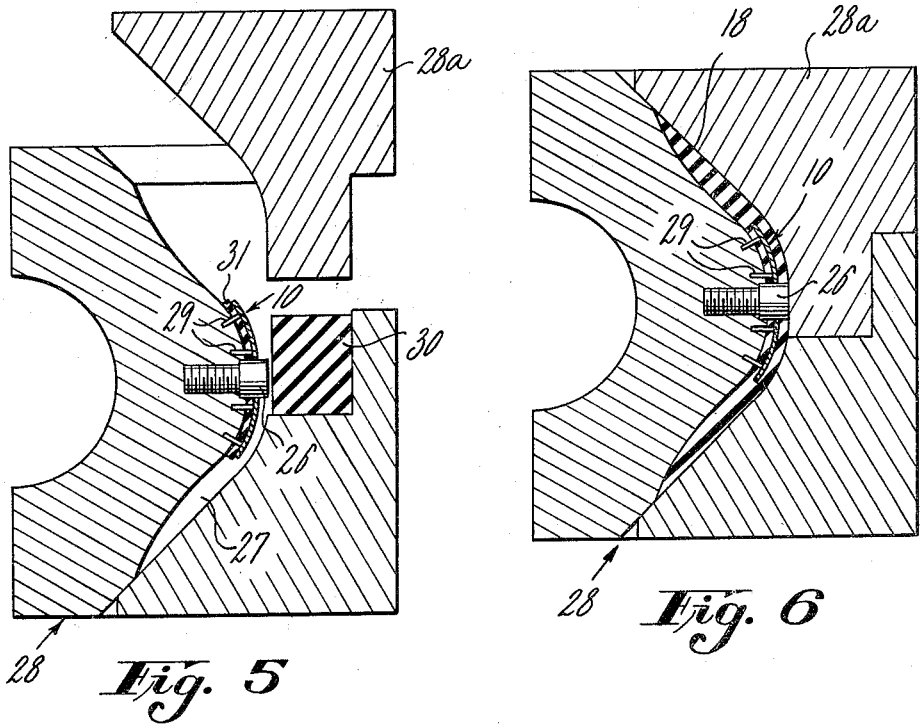
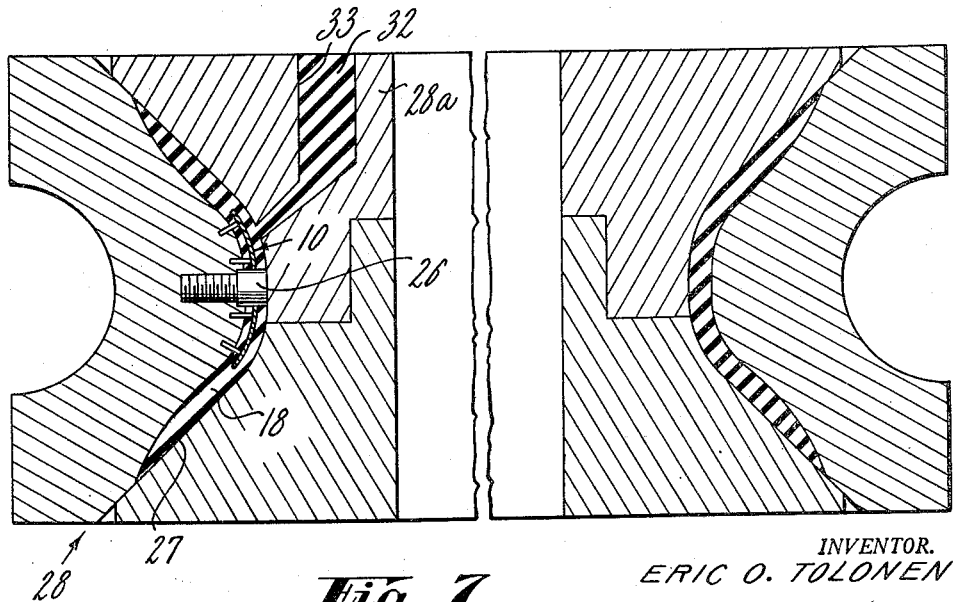

United States Patent Office 2,773,535
Patented Dec. 11, 1956

2,773,535

REINFORCEMENT FOR MOLDED FLAPS

Eric O. Tolonen, Grosse Pointe Woods, Mich., assignor to United States Rubber Company, New York, N. Y., a corporation of New Jersey Application August 24, 1953, Serial No. 375,950

1 Claim. (Cl. 152—365)

This invention relates to a tire flap and particularly to the provision of reinforcement around the valve stem opening through the flap.

A tire flap is a comparatively thick, continuous band, generally made of rubber, which is commonly placed between the inner tube of a pneumatic tire and the rim to protect the tube from damage by rocking movement of the beads of the tire and from abrasion by the rim and to prevent entry of foreign material into the interior of the tire casing.

One object of the present invention is to provide a tire flap incorporating a metal reinforcing plate which is embedded in the flap and surrounds the valve stem opening through the flap; the reinforcing plate providing a rigid seat for the flanged end of the valve stem and providing flexible reinforcement for the flap across the valve stem slot through the rim.

Another object of the present invention is to provide a metal reinforcing plate for the valve stem opening of a tire flap which may be incorporated and embedded in the flap during the molding and curing of the flap, thereby eliminating the expensive, time consuming operation of applying reinforcement to the flap after the flap has been formed.

Another object is to provide a metal reinforcing plate for a tire flap which will provide a rigid seat for the flanged end of the valve stem so as to prevent excess cocking and distortion of the valve stem.

A still further object is to provide a metal reinforcing plate of novel shape which will permit the use of comparatively inexpensive, light gauge, flexible metal but which at the same time will provide a rigid seat for the flanged end of a valve stem and will provide reinforcement for the flap across the slot or opening in the rim through which the valve stem extends.

Another object is to provide a metal reinforcing plate for the valve stem opening of a tire flap which will permit the flap to be used with various types of tire and rim assemblies.

Other objects and advantages of the present invention will become apparent from the following description when read in conjunction with the accompanying drawings, wherein:

Fig. 5 is a partial sectional view of a mold for forming a tire flap by transfer molding showing the placement of the reinforcing plate in the mold prior to forming the tire flap.

Fig. 6 is a partial sectional view of the mold of Fig. 5 showing the mold closed and the tire flap formed with the reinforcing plate embedded therein, and Fig. 7 is a sectional view of a mold for forming the tire flap by injection molding showing the tire flap formed and the reinforcing plate embedded therein.

Figure 1:
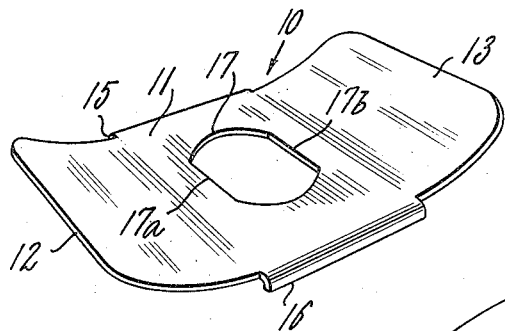
Fig. 1 is a perspective view of the metal reinforcing plate of the present invention.

Referring to the drawings and in particular to Fig. 1 of the drawings, the metal reinforcing plate of the invention, generally designated by the reference numeral 10, is formed from a single piece of comparatively light gauge, flexible, metal. Twenty-two gauge sheet steel has been found satisfactory for this purpose.

The reinforcing plate 10 has a flat central portion 11 and upwardly curved wing portions 12 and 13 which extend from each of two opposite sides of the central portion 11. The other opposite lateral edges of the flat central portion 11 are bent downwardly at approximately right angles to form short, reinforcing flanges or legs 15 and 16. The flanges or legs 15 and 16 render the flat central portion 11 quite rigid so as to provide a stable seat for the flanged end of the valve stem of the inner tube as will hereinafter be described. The wing portions 12 and 13, on the other hand, being unreinforced, are quite flexible and may be easily bent.

The reinforcing plate 10 is provided with a valve opening 17 which extends through the flat central portion 11. Opposed edges 17a and 17b of the opening 17 are made straight for a purpose as will hereafter be described.

Figure 2:
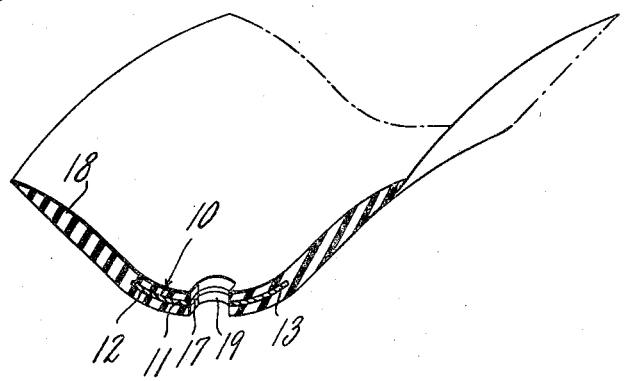
Fig. 2 is a cross-sectional view in perspective of a section of a tire flap incorporating the metal reinforcing plate of Fig. 1.

As shown in Fig. 2, the reinforcing plate 10 is embedded in a tire flap 18 with the opening 17 in alignment with a valve stem opening 19 which extends through the flap 18 and with the wing portions 12 and 13 extending transversely of the flap. While only a short section of the flap 18 is shown in Fig. 2, it is to be understood that the complete flap forms a continuous band.

The transverse width of the plate 10 is preferably made one-half to one-third of the transverse width of the flap 18. The width of the plate 10 between the flanges 15 and 16 is preferably approximately twice the length of the opening 17. The transverse width of the flat central portion 11 is also preferably twice the width of the opening 17.

Figure 3:
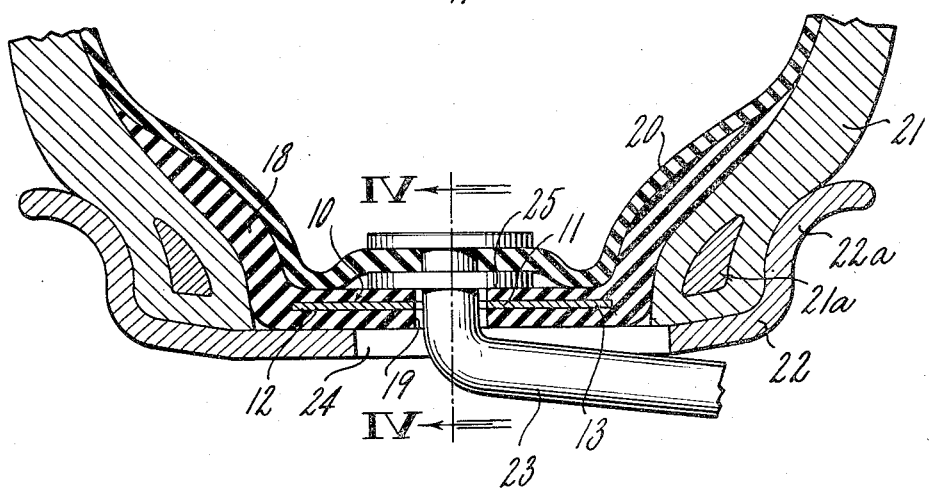
Fig. 3 is a sectional view of an assembled pneumatic tire, inner tube, rim and tire flap incorporating the reinforcing plate of Fig. 1.
Figure 4:
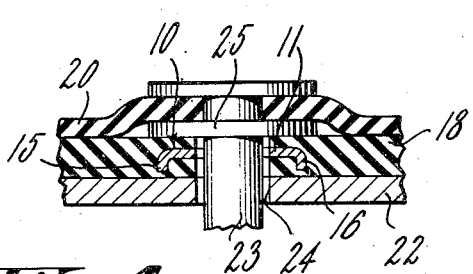
Fig. 4 is a sectional view taken on the line IV—IV of Fig. 3.

As shown in Fig. 3, the flap 18 as normally used, is interposed between the inner tube 20 of a pneumatic tire casing 21 and the rim 22 to protect the tube 20 from damage by rocking movement of the bead 21a of the tire 21 and abrasion by the rim 22 and prevent entry of foreign material between the tire and tube. The flange 22a of the rim 22 is removable as is conventional in heavy service rims to facilitate mounting and demounting of the tire.

The valve stem 23 of the inner tube 20 extends through the opening 19 in the flap 18 and through a slot 24 in the rim 22. It will be noted that in Fig. 3, the wing portions 12 and 13 of the reinforcing plate 10 are shown flat rather than curved as shown in Fig. 1. This is due to their flexibility which permits them to readily conform to the particular shape of the rim and tire assembly with which the tire flap is used. At the same time, however, the wings 12 and 13 provide reinforcement for the flap 18 across the rim slot 24 and prevent the flap 18 from bulging through the rim slot 24.

The flanged end 25 of the valve stem 23 by which the valve stem 23 is connected to the tube 20 seats over the flat central portion 11 of the reinforcing plate 10 which remains flat and rigid due to the provision of the short reinforcing flanges 15 and 16 and the end 25 is supported thereby so that excessive cocking and distortion of the valve stem 23 is thereby prevented. The reinforcing legs or flanges 15 and 16 also serve to assist in anchoring the reinforcing plate within the flap 18 and to prevent excess cocking of the valve stem.

As best shown in Figs. 5, 6 and 7, the metal reinforcing plate 10 is incorporated in the flap during the molding thereof. In Figs. 5 and 6 the flap is being formed by transfer molding. The metal reinforcing plate 10 is placed over a plug 26 which extends from and is threadedly secured to the wall of the mold cavity 27 of the mold 28. The plug 26 is provided with flat sides which correspond with the straight edges 17a and 17b of the opening 17 of the metal reinforcing plate 10 so that the metal reinforcing plate 10 is keyed to the plug 26 when placed thereover and cannot be displaced angularly during the subsequent molding of the flap. The reinforcing plate 10 is held spaced from the wall of the mold 28 by chaplet pins 29 which are secured in and extend from the wall of the mold 28.

The reinforcing plate 10 is preferably brass plated or otherwise treated prior to its placement in the mold to increase the adhesion thereof with the flap material. Raw rubber stock 30 is extruded into the annular cavity 27 of the mold 28 upon the closing of the complementary mold section 28a to form the flap 18 and to embed the metal reinforcing plate 10 in the flap as shown in Fig. 6. The plug 26 in addition to serving as a support for the reinforcing plate 10 also serves as a core to form the opening 19 through the flap. The mold is heated and the flap 18 is left in the heated mold until vulcanized to the desired degree.

Preferably, a thin layer 31 of raw rubber stock is placed over the plug 26 prior to the placement of the reinforcing plate 10 thereover to insure that the reinforcing plate 10 is completely embedded in the flap 18. The curvature of the wings 12 and 13 conforms to the curvature of the molding cavity 27, thereby insuring that the reinforcing plate 10 will be completely embedded in the flap 18 and that the reinforcing plate 10 will not score the wall of the mold 28 when the mold is closed.

In Fig. 7, there is shown the forming of the flap 18 by injection molding. Raw rubber stock 32 is injected through a passageway 33 provided through the wall of the mold section 28a into the molding cavity 27 to thereby form the flap 18. The reinforcing plate 10 is positioned in the mold in the same manner as described above in conjunction with the transfer molding of the flap 18. Any suitable injection unit may be used for injecting the rubber stock 32 into the mold cavity.

It is to be understood that the term rubber is used above in its generic sense to include natural rubber, synthetic rubber and blends thereof.

From the above description it can be seen that there is provided an improved tire flap. The flap incorporates a metal reinforcing plate for reinforcing the valve stem opening through the flap. The reinforcing plate is embedded in the flap and no part of the reinforcing plate can therefore come in contact with the inner tube. The reinforcing plate has a rigid central portion which provides a stable seat for the flanged end of the valve stem and has flexible wing portions which provide for reinforcement of the flap across the rim slot to prevent the flap from bulging through the rim slot. The wing portions are sufficiently flexible to permit the flap to conform to the particular shape of the tire and rim assembly in which it is used. The metal reinforcing plate may be made from comparatively light gauge metal as the reinforcing flanges render the central portion quite rigid while allowing the wing portions to be quite flexible.

While a certain preferred form of the invention has been shown and described, it is to be understood that variations can be made therein without departing from the spirit and scope of the invention.

Having thus described my invention, what I claim and desire to protect by Letters Patent is:

A continuous tire flap having a valve stem opening therethrough, a single metal reinforcing plate embedded in said flap, said plate having a central portion provided with an opening aligned with the valve stem opening, two opposed sides of said central portion being bent at substantially right angles to the central portion to form short reinforcing flanges which render said central portion rigid, and unreinforced comparatively flexible wing portions which extend transversely of the flap from each of two other opposed sides of said central portion.

References Cited in the file of this patent

UNITED STATES PATENTS

| | | |
|---|---|---|
| 1,391,483 | Kraft | Sept. 20, 1921 |
| 1,505,910 | Michelin | Aug. 19, 1924 |
| 1,728,825 | Green | Sept. 17, 1929 |
| 2,293,007 | Lyon | Aug. 11, 1942 |
| 2,597,550 | Tritt | May 20, 1952 |

FOREIGN PATENTS

| | | |
|---|---|---|
| 847,264 | Germany | Aug. 21, 1952 |